UNITED STATES PATENT OFFICE.

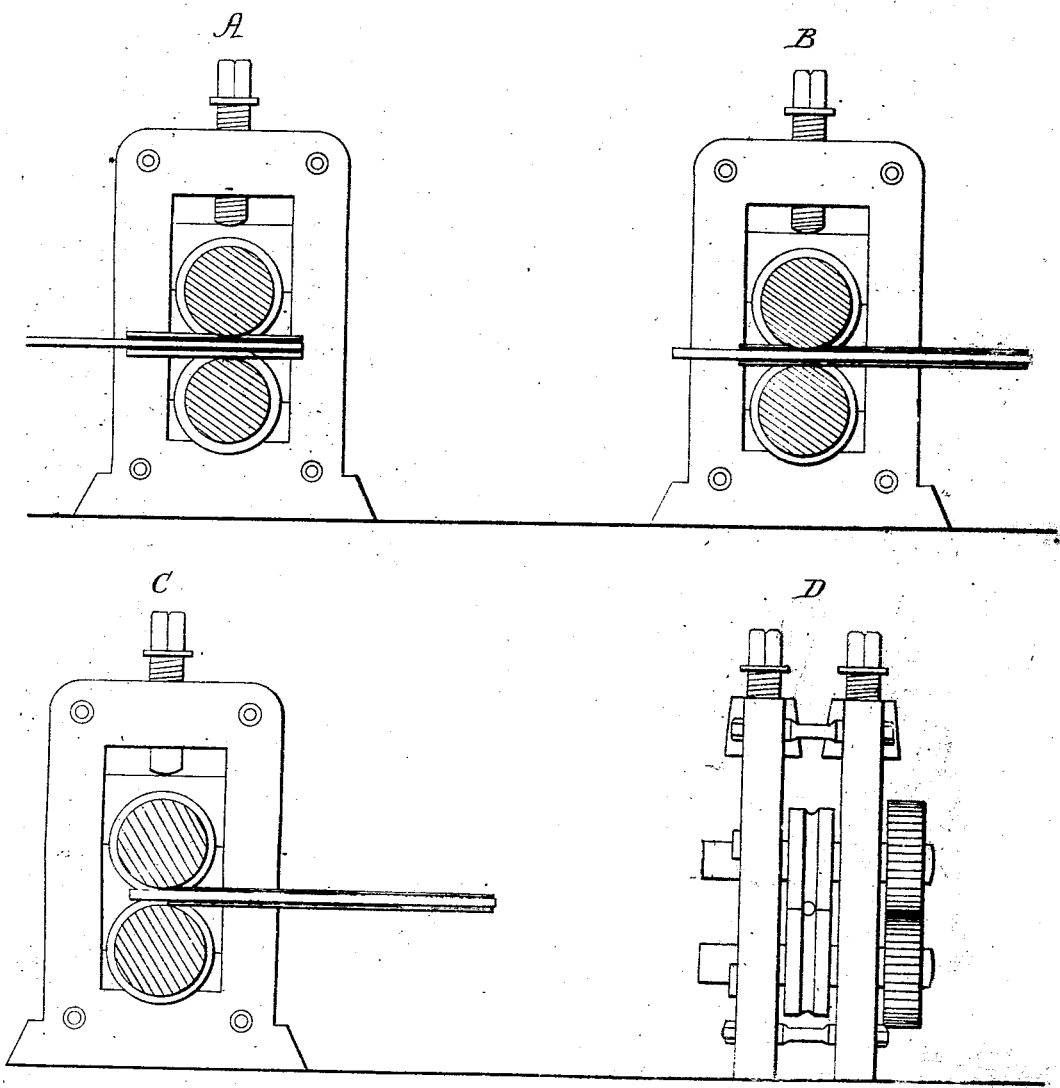

JOB CUTLER, OF BIRMINGHAM, ENGLAND.

METHOD OF LIBERATING METAL TUBES FROM FORMING-MANDRELS.

Specification of Letters Patent No. 8,250, dated July 29, 1851.

*To all whom it may concern:*

Be it known that I, JOB CUTLER, of Spark Brook, Birmingham, in the county of Warwick, in that part of the United Kingdom of Great Britain and Ireland called England, civil engineer, have invented and found out certain Improvements in the Manufacture of Metal Pipes or Tubes, and being desirous of obtaining Letters Patent for the United States of North America, have in accordance with the law of the said States hereinafter properly described my said invention; and I do hereby declare the same to be as follows—that is to say—

My invention relates to improvements in the manufacture of metallic pipes or tubes which have hitherto generally been brazed or soldered and cold drawn and with a seam or joint.

The various methods hitherto ordinarily practiced are as follows. If the tube about to be made is for a brazed or soldered joint tube, a strip of copper or brass or other alloys of metals is rolled into the required length width and thickness, it is then beveled or chamfered on its two alternate edges—this being done it is then turned up at the end some nine to twelve inches of the strip of metal into a cylindrical shape or nearly so to enable it to pass through a die with a hole in it commonly called a turning up or lapping bed. The turned up part of the strip is taken hold of by a pair of tongs attached to an endless chain fixed on a drawbench and being put in motion the strip is drawn through the die (a plug being used with the die in this process) when the flat strip is converted into a round or cylindrical form with one edge overlapping the other this process being performed it is then (what is termed) closed and bound round in places with wire to prevent its altering in shape while undergoing the process of brazing or soldering, it is then charged (that is) metal solder in a powdered state mixed with borax is placed along the seam or joint; it is then placed in a stove or small furnace and heated a small portion at a time to such a heat as to cause the solder to melt and run in the seam thereby causing the two edges to be secured the one on the top of the other, the process of soldering being completed and the two edges secured firmly together the wire bands are removed and the tube is pickled and cleansed from the scale or oxid that has been formed by the soldering process, it is again taken to the bench and passed through holes or dies and mandrels are passed through the tubes so as to make them round and cylindrical and to make them the exact external diameter required. They are then stretched to make them straight. All the above processes are practised and well understood by brass or copper tube makers. The expense attending the making of tubes by this process and their imperfections when made have led to many methods of manufacturing tubes without a brazed or soldered joint as being more serviceable and advantageous for steam boiler and other purposes, which tubes without seams or joints, are now manufactured as follows. A brass cylinder is cast in a mold with a sand or iron core inside and when the metal is sufficiently cold the core is removed and the brass cylinder annealed and when cold pickled or cleansed from all oxide or scale or other impure matter. When so cleansed a mandrel of steel or iron well oiled or greased is inserted into the metal cylinder which is then passed through holes or dies or through grooved rolls each hole or groove passed through being of smaller diameter than the hole or groove through which it had been previously drawn which has the effect of reducing the thickness of the metal and elongating the cylinder or tube but this repeated drawing of the tube on a mandrel in a cold state having the effect of hardening the metal and causing it to crack very much. It is necessary to withdraw the mandrel from time to time by means of a drawbench for the purpose of annealing the tube to soften it and then to pickle and cleanse the tube from the oxid or scale occasioned by such annealing so that the same operation of withdrawing and reinserting the mandrel of annealing and cleansing the tube and of drawing the tube and mandrel through holes or through grooves in the rolls each time of smaller diameter has to be repeated several times before the tube is reduced to the required length diameter and thickness. The withdrawing of the mandrel is often effected with great difficulty and many tubes are spoiled and made waste in performing this operation. Others instead of drawing the tubes through holes or dies or through grooves in rolls by means of pliers attached to the endless chain of a drawbench adopt the principle or method of passing them through grooves in rolls by the means of the rolls being driven by gear or toothed wheels and worked by motive power while the tube is in a cold state the friction or pressure on the tube, propelling it forward and by so rolling the same or nearly the same results are obtained as though they were driven or drawn by the aid of a drawbench, the same same withdrawing of the mandrel the same amount of annealing, pickling and cleansing and the same reinserting of the mandrel and the same repeated rollings being necessary to prevent the metal from cracking and to prevent the tube from being so firmly fixed on the mandrel as to render it impossible to withdraw the mandrel without spoiling the tube and to reduce it to the length, diameter and thickness required.

The part of my invention which relates to the manufacture of tubes of copper or brass or other metals or alloys of metals is to be performed as follows: In making metal tubes without seam or joint, if for a brass tube I take the necessary proportions of copper and zinc similar to Muntz's mixture for rolling hot (or the patent brass mixture of I. D. M. Stirling as described in his specification enrolled in the High Court of Chancery of England on the twenty-ninth day of December one thousand eight hundred and forty-six which will in my opinion be found to answer better) or any other mixture that will roll hot and put such proportions into a casting pot, which pot is in a furnace and is well understood among metal casters, when the metal is sufficiently heated I proceed to run it into a mold or matrix either of iron or steel or other known substance. In the center of the mold or matrix I place a core of sand or other suitable or proper material and which is well undestood and practiced by various branches of the metal trades, such as printing cylinders, blunderbuss, barrels, casters, &c., the mold or matrix being of sufficient diameter to hold sufficient metal to enable the tube to be rolled out to the proper length, diameter and thickness required. When this is done the metal in its melted or fluid state is then poured in to the mold or matrix so prepared and when sufficiently cold and the metal set I remove it from the mold or matrix and also remove the core and afterward if necessary I pickle and clean it. I then place it in a furnace to become sufficiently hot to stand rolling, when in this state I insert a mandrel within the tube and proceed to pass it through a series of grooves in rolls each groove through which it passes in succession being smaller than the one through which it last passed and in this way and by this means I continue to roll the tube while hot until it is elongated to the required length and reduced to the required thickness and the required or nearly so diameter.

In Figure 1 of the annexed drawings A represents a sectional elevation of the grooved rolls suitably mounted in standards through which the tube is first passed upon the mandrel. B is a similar elevation showing the tube or pipe passing through the rolls on the mandrel. C is a similar elevation showing the pipe or tube also on the mandrel and just leaving the rolls. D is an elevation of the grooved rolls on their standards showing the circle formed by their grooves. Instead of using grooved rolls with single grooves in each set of rolls as above described and shown in the said sheet of drawings Fig. 1 hereunto annexed several sets of grooves of gradually increasing diameter may be turned in one pair of rolls which are proportionately increased in length for that purpose, the rolls being made similar to those used for rolling round iron ship bolts, &c., other combinations of grooved rollers may be used but I prefer the mode above described by me. Having thus reduced the tubes by passing them through a succession of grooves in rolls and the kind of rolls which I prefer to use are those shown by Fig. 1 of the annexed drawings. I next proceed to withdraw the mandrel which I effect in the following manner: I pass the tube on the mandrel from the rolls to a machine containing two, three or more rolls (see Figs. 1Z, 2Z, 3Z).

Fig. 1Z is a drawing of a three roll machine. A is a front view. B is a side view. C is a plan or horizontal view of the machine; $a\,a\,a$ is the framing; $b\,b\,b$ are the rolls; $c\,c\,c$ are peg pulleys by means of which the rolls are driven; $d\,d$ is an endless chain or belt working on the peg pulleys by which means the rolls are driven; $e\,e$ are friction pulleys over which the chain or belt runs to tighten it as circumstances may require; $f\,f$ are metal wheels used in connection with the rod or shaft $g$ to move backward and forward one of the rolls $b$ so as to give ease to the tube on the mandrel, while it is pushed further between the rollers $b\,b\,b$ so as to cross roll the tube on the mandrel—that is, to roll the tube a portion at a time in lieu of having the rolls the full length of the tube; $g$ is the rod or shaft carrying the wheels $f\,f$ which move the roll $b$ backward and forward; $h$ is a cross shaft with working wheels to give motion for tightening and slackening the friction pulley while the roll $b$ is being moved backward and forward. L is the driving wheel (or a crank may be used) by which the rolls are set in motion. $l$ are adjusting pins by which the rolls $b\,b\,b$ are set to operate on the various sized tubes. $j$ is the aperture or space between the rollers where the tube or the mandrel is placed for the purpose of being cross rolled by the rolls $b\,b\,b$. $k$ is the handle or crank by which $g$ is turned to move backward and forward the roller $b$. This may either be worked by power or by hand. Roll b 1 is made to move up and down so as to be adjusted to the other rolls.

Fig. 2Z is a drawing of a three roll machine with the rolls at angles so as to form a circle in the center. D is a front view. E is a sectional view and F is a side view. a a a is the frame work. b b b the rolls. c c c c c are toothed wheels as shown on the drawings for working the rolls b b b (but I prefer to work them in the same manner as described by drawing Fig. 1Z) and which are made to slide in their journals to enable the rolls to be adjusted to any sized tube. d are adjusting pins by which the rolls b b b are set in their proper positions to accommodate any sized tube that may be required to be cross rolled either to loosen it on the mandrel or make the tube perfectly straight and cylindrical and regulating and equalizing the thickness of the metal throughout. e is the opening or space between the rolls into which the tube on the mandrel is placed. f the blue line represents the tube between the rolls.

Fig. 3Z is a drawing of a two roll machine by which the tube on the mandrel may be released (but I prefer to use the machine as described in drawing Fig. 1Z). G is a front view. H is a plan or horizontal view. I is a side view. a a a a is the frame work. b b are the two rolls. c c are the adjusting pins to the rolls. d d is a cross bar in front of the rolls on which are placed two sliding stops e e to fix against each end of the mandrel while the rolls are operating on the tube, the mandrel projecting at each end beyond the tube which has been rolled upon it. e e are the two stops to fix against the mandrel as before described. f f are the two adjusting screws or pins by which the stops are regulated. h h are the two screws and nuts by which the cross bar d in the frame a is moved nearer to and farther from the rolls. g g are two stops placed on the frame on the reverse side of the rolls as steadying blocks to the mandrel. i i are the adjusting pins to the stops g g. By means of the several sorts of rollers just described I cross roll the tube. This has the effect of sufficiently enlarging the diameter of the tube and releases or eases it upon the mandrel so that the mandrel can easily be withdrawn either by a pair of tongs or pliers by means of a drawbench or otherwise without difficulty or without in the slightest manner injuring the tube. The mandrel may be made in compartments so as to facilitate the withdrawing it from the tube but I prefer a mandrel all in one piece whether taper or parallel, but it is not necessary that it should be solid as hollow tubes as mandrels for large diameter tubes will be found to answer very well. If the tube should be slightly too large in its diameter from its cross rolling it can be passed once through a hole die or drawplate or through a groove in the rolls, the hole being of the exact external diameter of the tube required. If the rolls for cross rolling are of a greater length than about four or five feet as shown in the drawings (Fig. 1Z) they should be slightly stayed or supported in places to prevent them springing. This may be done by having some soft substance on the top of the support such as leather well oiled or other soft material. It will not require any very great pinch or pressure to cross roll the metal sufficiently to ease it on the mandrel. A tube may be eased by placing it on a flat piece of iron or other hard substance and another flat plate of iron brought to bear upon it and rolled backward and forward in the same manner as iron tubes are now straightened, but the mode of cross rolling which I prefer to use for this purpose is a machine consisting of three rolls (see Fig. 1Z) which may be made three, four, five or six feet long as may be found most suitable, and by movable gear one of the said rolls may be made to play backward and forward as shown in drawing Fig. 1Z. By this means the tube on the mandrel may be moved forward on the rolls with ease and at pleasure so as to cross roll the tube a portion at a time without any fear of the rolls springing. The strength of the rolls and machinery required will depend upon the work it has to perform. Tubes either rolled or drawn upon a mandrel in a cold state may be released by the means of cross rolling or by the other modes as herein described and the mode of working the rolls may be varied from those shown in the drawings, not confining myself to any particular mode of working or driving the rolls.

Having now described the nature of my said invention and in what manner the same is to be performed I wish it to be understood that I do not claim the exclusive use of the rolls for cross rolling hereinbefore described and represented, except when the same are employed in the manufacture of pipes or tubes of copper, brass, or other alloys of metal as herein described to be used as the flues of steam boilers. But

What I do claim—

In the manufacture of pipes or tubes of brass, copper, and alloys of metal for the use as the flues of steam boilers by rolling hot on a mandrel whether parallel or taper is the enlarging of them by means of cross rolling as above described for the purpose of extracting the mandrel.

As witness my hand this second day of June one thousand eight hundred and fifty one.

JOB CUTLER.

Witnesses:
J. M. G. UNDERHILL,
WILLIAM CLEMENT SMITH.